:

US008984028B2

(12) United States Patent
Verschoor

(10) Patent No.: US 8,984,028 B2
(45) Date of Patent: Mar. 17, 2015

(54) SYSTEMS AND METHODS FOR STORING DATA AND ELIMINATING REDUNDANCY

(75) Inventor: Richard Verschoor, Sydney (AU)

(73) Assignee: Recommind, Inc., San Francisco, CA (US)

( * ) Notice: Subject to any disclaimer, the term of this patent is extended or adjusted under 35 U.S.C. 154(b) by 0 days.

(21) Appl. No.: 13/482,907

(22) Filed: May 29, 2012

(65) Prior Publication Data

US 2013/0325908 A1 Dec. 5, 2013

(51) Int. Cl.
*G06F 17/30* (2006.01)

(52) U.S. Cl.
USPC .......................................................... 707/812

(58) Field of Classification Search
CPC ............... G06F 17/30091; G06F 17/30318; G06F 17/30312
USPC .......................................................... 707/812
See application file for complete search history.

(56) References Cited

U.S. PATENT DOCUMENTS

| | | | |
|---|---|---|---|
| 5,574,906 A | 11/1996 | Morris | |
| 5,990,810 A | 11/1999 | Williams | |
| 6,671,703 B2 | 12/2003 | Thompson et al. | |
| 6,704,730 B2 | 3/2004 | Moulton et al. | |
| 7,082,455 B2 | 7/2006 | Hu et al. | |
| 7,860,843 B2 | 12/2010 | Dodd et al. | |
| 7,899,789 B2 | 3/2011 | Schwaab et al. | |
| 7,979,394 B2 | 7/2011 | Morris et al. | |
| 8,037,028 B2 | 10/2011 | Prahlad et al. | |
| 8,051,050 B2 * | 11/2011 | Popovski et al. | 707/692 |
| 8,055,692 B2 | 11/2011 | Horn | |
| 8,145,601 B2 | 3/2012 | Zizys et al. | |
| 2001/0013087 A1 * | 8/2001 | Ronstrom | 711/133 |
| 2002/0196468 A1 * | 12/2002 | Klassen et al. | 358/1.18 |
| 2005/0256886 A1 | 11/2005 | Armanino et al. | |
| 2008/0115055 A1 * | 5/2008 | Sadovsky et al. | 715/255 |
| 2008/0243958 A1 * | 10/2008 | Prahlad et al. | 707/204 |
| 2010/0161554 A1 | 6/2010 | Datuashvili et al. | |
| 2010/0223441 A1 | 9/2010 | Lillibridge et al. | |

(Continued)

FOREIGN PATENT DOCUMENTS

WO WO2013180891 12/2013

OTHER PUBLICATIONS

Tolia et al., Opportunistic use of content addressable storage for distributed file systems, Proceedings of the 2003 USENIX Annual Technical Conference, 127-140, San Antonio, TX.
Constantinescu et al., Mixing Deduplication and Compression on Active Data Sets, Data Compression Conference (DCC), DCC '11 Proceedings of the 2011 Data Compression Conference IEEE Computer Society Washington, DC, USA, pp. 393-402.

(Continued)

*Primary Examiner* — Joshua Bullock
(74) *Attorney, Agent, or Firm* — Carr & Ferrell LLP

(57) ABSTRACT

A method for effective data storing allowing reducing storage requirements and speeding up various storage operations by reducing storage of redundant data is disclosed. The method includes receiving new informational objects (such as computer files) for storage and breaking down the new informational objects into multiple data objects. Each data object is analyzed to determine whether an identical data object already exists in a database. If an identical data object already exists in the database, the new data object is not stored. If, on the other hand, an identical data object does not exist in the database already, the new data object is stored. Furthermore, for each informational object to be stored, relational links are generated which associate the data objects and their storage locations with the informational object such that the informational object can be easily recreated when required.

21 Claims, 5 Drawing Sheets

(56) References Cited

U.S. PATENT DOCUMENTS

2010/0293142 A1* 11/2010 Ackerman et al. ............ 707/640
2010/0299311 A1   11/2010 Anglin et al.
2011/0004639 A1    1/2011 Williams
2011/0106811 A1*  5/2011 Novoselsky et al. .......... 707/741
2012/0036113 A1    2/2012 Lillibridge et al.
2012/0084519 A1    4/2012 Vijayan et al.

OTHER PUBLICATIONS

You et al., Presidio: A Framework for Efficient Archival Data Storage, ACM Transactions on Storage (TOS), vol. 7 Issue 2, Jul. 2011.
International Search Report and Written Opinion mailed Nov. 1, 2013 in Patent Cooperation Treaty application No. PCT/US2013/039334, filed May 2, 2013.

* cited by examiner

SYSTEMS AND METHODS FOR STORING DATA AND ELIMINATING REDUNDANCY

TECHNICAL FIELD

This disclosure relates generally to data storage management, and, more specifically, to computer-implemented methods and systems for storing informational objects (such as computer files) by dividing them into multiple data objects so that only one copy of the same data object is stored, thereby eliminating unwanted redundancy.

DESCRIPTION OF RELATED ART

The approaches described in this section could be pursued but are not necessarily approaches that have been previously conceived or pursued. Therefore, unless otherwise indicated, it should not be assumed that any of the approaches described in this section qualify as prior art merely by virtue of their inclusion in this section.

Currently, computing systems are in wide use, and the volume of information processed by these systems continues to grow. According to some researchers, the amount of data processed and stored by computing systems doubles every two years, thereby generating a constant need to make memory structures more efficient so that they can store more data. Such data may include personal information, such as text documents, photographs, video files, audio files, and emails, and also industry-related information, such as digital sensors information, digital equipment information, and so forth. The data can be stored locally or remotely and is typically presented as informational objects including, for example, computer files, operational system files, routine objects, and so forth.

Although a computing system may include some unique data, computing systems often include similar or even identical information fragments, thereby generating unwanted redundancy. For example, it is very common in corporate environments to have multiple computing systems store copies of the same informational objects. These duplicate informational objects may be encrypted, compressed, separated into multiple parts, distributed over a network, or otherwise processed for protection and storage. Several approaches have been developed to reduce redundant data; however, these approaches are limited to files of the same type or to a single software application.

SUMMARY

This summary is provided to introduce a selection of concepts in a simplified form that are further described below in the Detailed Description. This summary is not intended to identify key features or essential features of the claimed subject matter, nor is it intended for use as an aid in determining the scope of the claimed subject matter.

The present disclosure relates to computer-implemented methods and systems for effective storing of data having redundant fragments. Overall, these methods and systems may allow reducing storage requirements and speeding up storage operations. Once a new informational object, such as a computer file, is received for storing within a memory, the informational object may be broken down into multiple components (data objects). Additionally, relational links between these multiple components are generated. Each component is analyzed to determine whether an identical component already exists within the memory. If an identical component exists, the component is not stored. If, on the other hand, an identical component does not exist, the component is considered new and stored within the memory. The relational links associate components and their storage locations in the memory with the informational object such that the informational object can be easily recreated when required. The relational links may be stored in the same or different database. Accordingly, any redundant data contained within informational objects is stored only once, which allows for significantly increased storage efficiency.

In accordance with an example embodiment, there is provided a computer-implemented method for storing data. An example method may comprise receiving an informational object, retrieving one or more data objects from the informational object, determining which data objects of the informational object were not previously stored in at least one database, generating relational links between the one or more data objects and the informational object, and storing the one or more data objects that were not previously stored in at least one database and the relational links.

In various embodiments, the method may further comprise identifying a type of the informational object. The retrieving of the one or more data objects from the informational object can be based upon the type of the informational object. The method may further comprise storing the informational object as a binary object in the at least one database if the type of informational object is not identified. The method may further comprise determining data objects of the informational object that were previously stored in the at least one database. The relational links can define storage locations associated with the one or more data objects in the at least one database and/or an order of the one or more data objects as presented in the informational object. The method may further comprise compressing and/or encoding the one or more data objects. The data objects and the relational links can be stored in different databases. The method may further comprise tracking usage of the one or more data objects. The method may further comprise caching one or more data objects. The one or more data objects can be stored at least as a part of a binary large object (BLOB). The one or more data objects are stored at least as a part of a character large object (CLOB). The method may further comprise generating an informational object identifier uniquely identifying the informational object and generating one or more data object identifiers uniquely identifying the one or more data objects. The relational links can be associated with the informational object identifier and the one or more data object identifiers. The informational object may comprise one or more of a computer file, a binary object, and a program code. The data objects may comprise one or more of the following: a text, an image, a video, an audio, a multimedia object, a program code, a numerical value, and a data structure.

In further examples, the above methods steps are stored on a machine-readable medium comprising instructions, which when implemented by one or more processors perform the steps. In yet further examples, subsystems or devices can be adapted to perform the recited steps. Other features, examples, and embodiments are described below.

BRIEF DESCRIPTION OF THE DRAWINGS

Embodiments are illustrated by way of example, and not limitation, in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made, without departing from the scope of what is claimed. The following detailed description is, therefore, not to be taken in a limiting sense, and the scope is defined by the appended claims and their equivalents.

The techniques of the embodiments disclosed herein may be implemented using a variety of technologies. For example, the methods described herein may be implemented in software executing on a computer system or in hardware utilizing either a combination of microprocessors, or other specially designed application-specific integrated circuits (ASICs), programmable logic devices, or various combinations thereof. In particular, the methods described herein may be implemented by a series of computer-executable instructions residing on a storage medium such as a disk drive or a computer-readable medium.

The embodiments described herein relate to computer-implemented methods for storing large volumes of data. More specifically, the methods enable the effective storage of informational objects (e.g., computer files, binary objects, and program codes) so that any redundant or duplicate components presented in one or multiple informational objects are stored only one time. This approach enables increased operational speeds, decreased memory resources needed for storing large volumes of data, and enhanced effectiveness of data storage management.

The present teachings involve receipt of multiple informational objects with a request to store them in a memory. Once a new informational object is received, the object is "exploded" into one or more components. This process can be based on a type of informational object, and those skilled in the art will understand that many different techniques can be used for separation of an informational object into components depending on its type. The components retrieved from the informational objects may represent various data objects such as, for example, text fragments, images, video, audio, multimedia objects, program codes, numerical values, and data structures. Further, these components are stored in the memory if there are no same components stored in the memory already. This process is illustrated in FIG. 1, which is a simplified flow diagram of a method 100 for storing the informational object in the memory.

Figure 1:
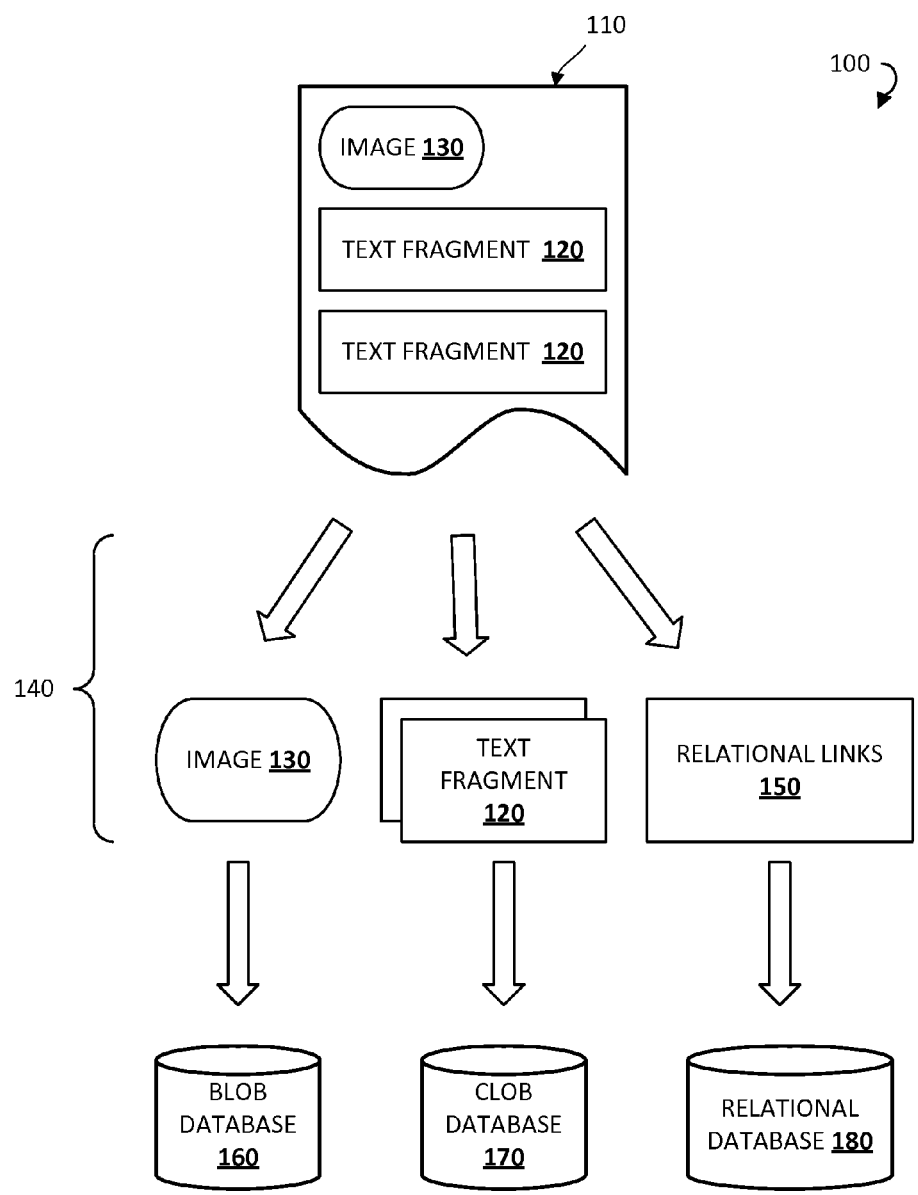
FIG. 1 shows a simplified flow diagram of method for storing an informational object in a memory.

In FIG. 1, there is an informational object 110 to be stored in the memory. For example, the informational object 110 is a Microsoft Office® document, which includes multiple data objects such as text fragments 120 and also an image 130. It should be understood that the informational object 110 can also refer to another text document, e-mail, image, video, audio, program code, binary object, and so forth. When the informational object 110 is received for further storing in the memory, it can be, at first, analyzed to determine what type of informational object 110 is. Based upon the type of informational object 110, a particular "exploding" algorithm can be applied to retrieve the data objects 120 and 130 from it.

The "exploding" process is denoted in FIG. 1 by the reference number 140. In addition to retrieving of the data objects 120 and 130, a set of relational links 150 are also generated. The relational links 150 define relations and associations between the data objects 120, 130 and the informational object 110. In various embodiments, the relational links 150 may also include identifiers of the data objects 120, 130 and the informational object 110. Moreover, the relational links 150 may also include information on locations (addresses) of the data objects 120, 130 stored in the memory. The relational links 150 may also define an order of the data objects originally appearing in the informational object (this information may be used for reconstruction of the informational object).

Further, the data objects 120, 130 and the relational links 150 are stored in the memory. More specifically, the data objects 120, 130 and the relational links 150 can be stored in one and the same database or different databases. For example, the image 130 can be stored in BLOB database 160, the text fragments 120 can be stored in CLOB database 170, and the relational links 150 can be stored in a relational database 180. BLOB database 160, CLOB database 170, and relational database 180 can be embedded within a single memory structure or, alternatively, presented in different memory structures.

It is determined whether one or more of data objects retrieved from informational objects 110 are already stored in one of the databases 160, 170. If it is determined that certain data objects are already stored in the databases 160, 170, such data objects are not stored for the second time. Instead, the relational links 150 generated for the informational objects 110 merely include a reference to the data objects that are already stored in the databases 160, 170. Those data objects retrieved from the informational objects 110, which were not previously stored, are now stored in the databases 160, 170, and corresponding relational links 150 are generated to define associations between these data objects, their storage locations, and the informational objects 110. Accordingly, once a user wants to load a particular informational object 110 from the memory, first, the relational links 150 that identify corresponding data objects associated with requested informational object 110 are loaded, and then these data objects are loaded for further reconstruction of the informational object 110.

It should also be understood that some informational objects 110 cannot be exploded, and no data objects can be retrieved. For example, corrupted or encoded informational objects 110 may not be separated into multiple data objects. Such informational objects 110 may be represented as a single data object that is stored just as a single binary object (for example, in BLOB database 160).

In addition, data objects retrieved from the informational objects 110 and/or generated relational links 150 can be further encoded and/or compressed before storing in one or more of the databases 160-180. Moreover, the data objects stored in the database 160 and/or 170 can be constantly monitored, and their usage can be also tracked. For example, data objects that are frequently accessed can be cached so that memory operations are faster. The encoding/compressing and/or caching can further increase storage effectiveness and operational speeds.

In an example, the teachings disclosed herein can be effectively used in corporate environments. Typically, in a corporate environment, e-mails, presentations, corporate text documents, and other computer files may include one and the same components, such as, for example, a corporate logo. When all these different informational objects are stored in one or more corporate computing devices, they are all stored separately. Thus, any same components (e.g., the corporate logo) comprised in these entire informational object, are stored multiple times, thereby generating unwanted redundancy. The present teachings enable reducing or even eliminating this redundancy by storing only those components of the informational objects that are not yet stored. In the given example, the corporate logo will be stored one time only, while all other stored documents may have a reference to the stored logo via their relational links. Thus, the present teachings provide effective mechanisms for storing large volumes of data having redundant components.

Figure 2:
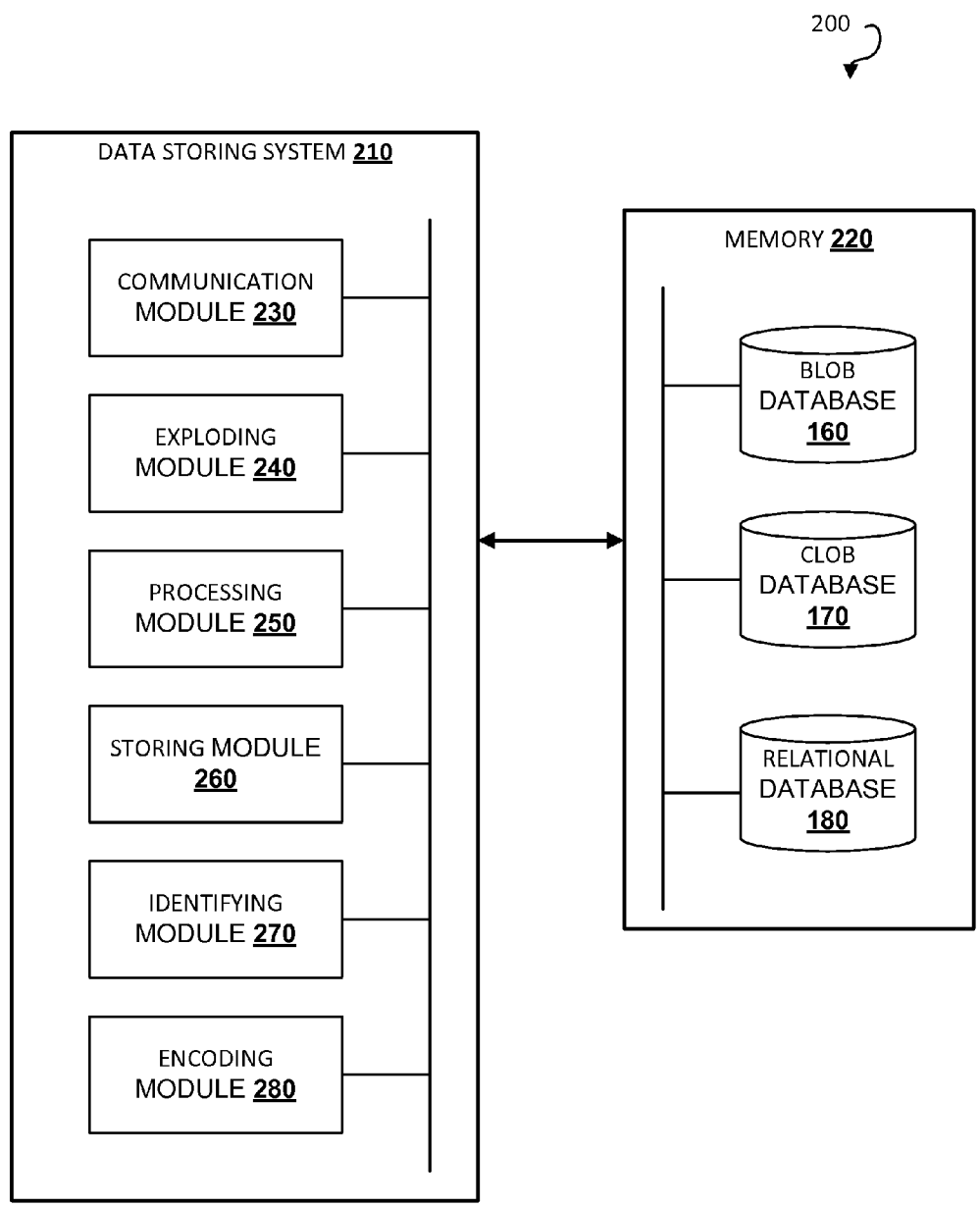
FIG. 2 shows a block diagram illustrating a system environment suitable for implementing various methods for data storing.

FIG. 2 shows a block diagram illustrating a system environment 200 suitable for implementing methods for data storing. In particular, the system environment 200 comprises a data storing system 210 and a memory 220.

The data storing system 210 is configured to implement methods for storing data as described herein. The data storing system 210 may be implemented as computer code, software, firmware, hardware, or any combination thereof. In an example, the data storing system 210 and the memory 220 can be included in a single computing device, such as a tabletop computer, laptop computer, tablet computer, cellular phone, smart phone, and so forth.

As shown in the figure, the data storing system 210 may comprise a communication module 230, an exploding module 240, a processing module 250, a storing module 260, an identifying module 270, and an optional encoding module 280. In general, all of these modules 230-280 can be integrated within a single apparatus, or, alternatively, can be remotely located and optionally accessed via a third party. The data storing system 210 may further include additional modules, but the disclosure of such modules is omitted so as not to burden the entire description of the present teachings.

The communication module 230 may be configured to enable communication between the data storing system 210 and the memory 220, which may include one or more of BLOB database 160, CLOB database 170, and relational database 180. More specifically, the communication module 230 may be configured to receive informational objects (e.g., computer files, binary objects, routine objects) for storing within the memory 220. Furthermore, the communication module 230 may be configured to provide various data objects and relational links stored in the memory 220 upon request.

The exploding module 240 may be configured to retrieve one or more data objects from informational objects received by the communication module 230. The retrieving may be performed in a number of different ways depending on a type of informational object. In general, the data objects may refer to character information (text, words, phrases), images, video, audio, multimedia objects, program codes, numerical values, data structures, and so forth.

For example, for Microsoft Office® documents, an Extensible Markup Language (XML) file can be retrieved from the Microsoft Office® documents. XML files may define the templates from which the Microsoft Office® documents are generated. In addition, multiple text fragments, numerical values, and/or images can be retrieved from the Microsoft Office® documents. Those skilled in the art will appreciate that various data objects can be retrieved depending on application.

The processing module 250 may be configured to determine whether or not data objects retrieved from informational objects were previously stored in one or more databases 160, 170. In other words, once a data object is retrieved from an informational object, it is determined whether it is a new data object or if the same data object is already in one of the databases.

The processing module 250 may be further configured to generate relational links uniquely identifying relations between the informational objects and their corresponding data objects. The relational links may include identifiers of both the informational objects and data objects, as well as their storage locations (e.g., memory addresses).

The storing module 260 may be configured to store the data objects in BLOB database 160 or CLOB database 170, and store the relational links in the relational database 180. In an embodiment, all databases 160-180 are embedded within a single database or a single memory. In an alternative embodiment, the databases 160-180 are separate structures. Furthermore, it should be mentioned that various binary data objects (e.g., images, video, program code) are stored in BLOB database 160, while character information (e.g., text fragments) are stored in CLOB database 170.

The identifying module 270 may be configured to identify types of informational objects received by the communication module 230. Determination of informational object types may facilitate the process of their virtual exploding and retrieving data objects. The identifying module 270 may be further configured to generate informational object identifiers uniquely identifying each newly received informational object, and also generate data object identifiers uniquely identifying every data object retrieved from the informational objects. The informational object identifiers and data object identifiers can be used in relational links for unambiguous identification of informational objects and data objects.

The encoding module 280 may be configured to compress and/or encode the one or more data objects when retrieved from informational objects. This module is optional and may be used merely for effective data storage.

Figure 3:
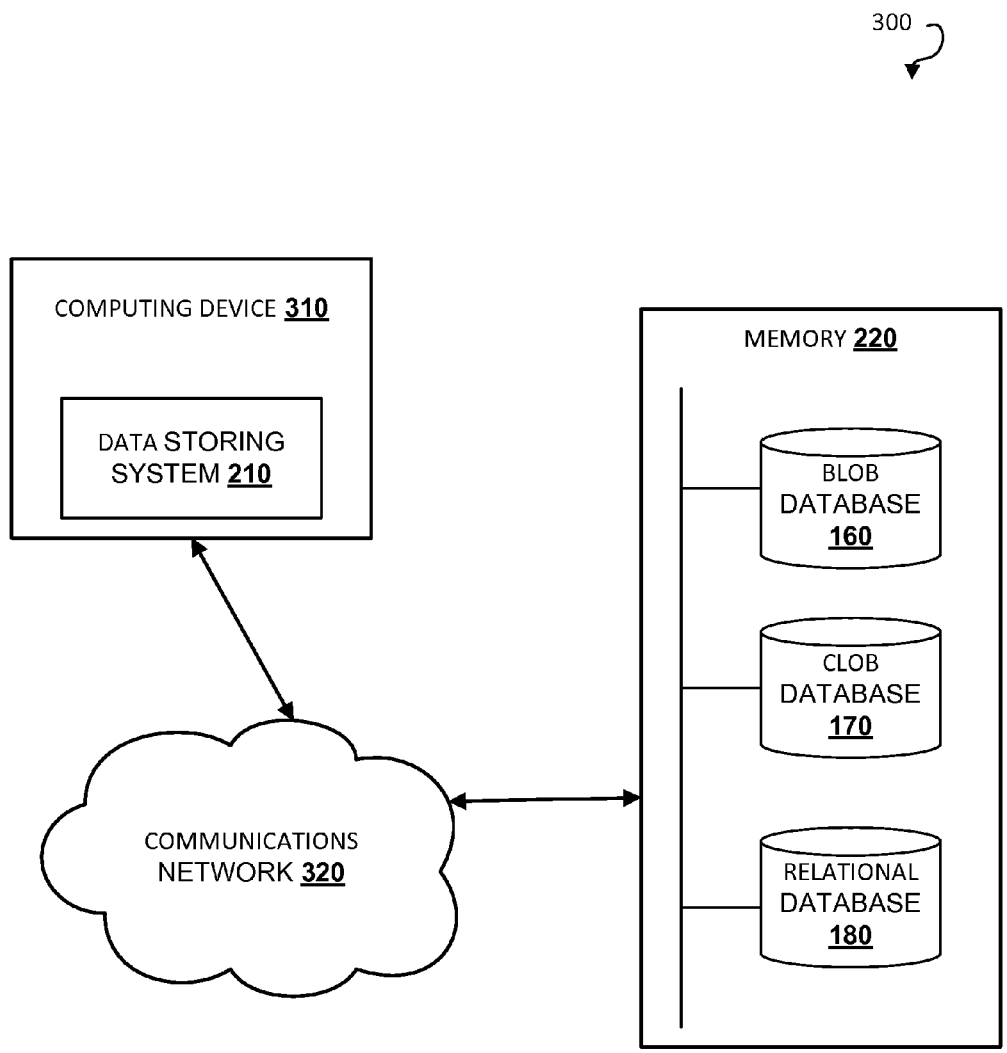
FIG. 3 shows a block diagram illustrating another system environment suitable for implementing various methods for data storing.

FIG. 3 shows a block diagram illustrating a system environment 300 suitable for implementing methods for data storing. In particular, the system environment 300 comprises a computing device 310, a memory 220, and a communications network 320.

In general, each computing device 310 refers to an electronic device having networked connectivity. Examples of computing devices 310 include, but not limited to, a computer (including a laptop computer, a desktop computer, a tablet computer, and a portable computing device), server, thin client, personal digital assistant (PDA), handheld cellular phone, mobile phone, smart phone, and game console. As shown in the figure, the computing device 310 may include the data storing system 210. For example, the data storing system 210 may be presented as computer code, and thus the data storing system 210 is installed onto the computing device 310. The more detailed description of the computing device 310 suitable for embedding the data storing system 210 is given below with reference to FIG. 5.

The memory 220 may include one or more of BLOB database 160, CLOB database 170, and relational database 180. In the shown embodiment, the databases 160-180 are remotely located from the computing device 310 and the data storing system 210. For example, the databases 160-180 can be a part of server (e.g., a web server) or similar device.

With continuing reference to FIG. 3, the communications network 320 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port, such as a V.90, V.34 or V.34 bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The communications network 320 can further include or interface with any one or more of the following: RS-232 serial connection, IEEE-1394 (Firewire) connection, Fiber Channel connection, IrDA (infrared) port, SCSI (Small Computer Systems Interface) connection, USB (Universal Serial Bus) connection, or other wired or wireless, digital or analog interface or connection, mesh or Digi® networking.

Figure 4:
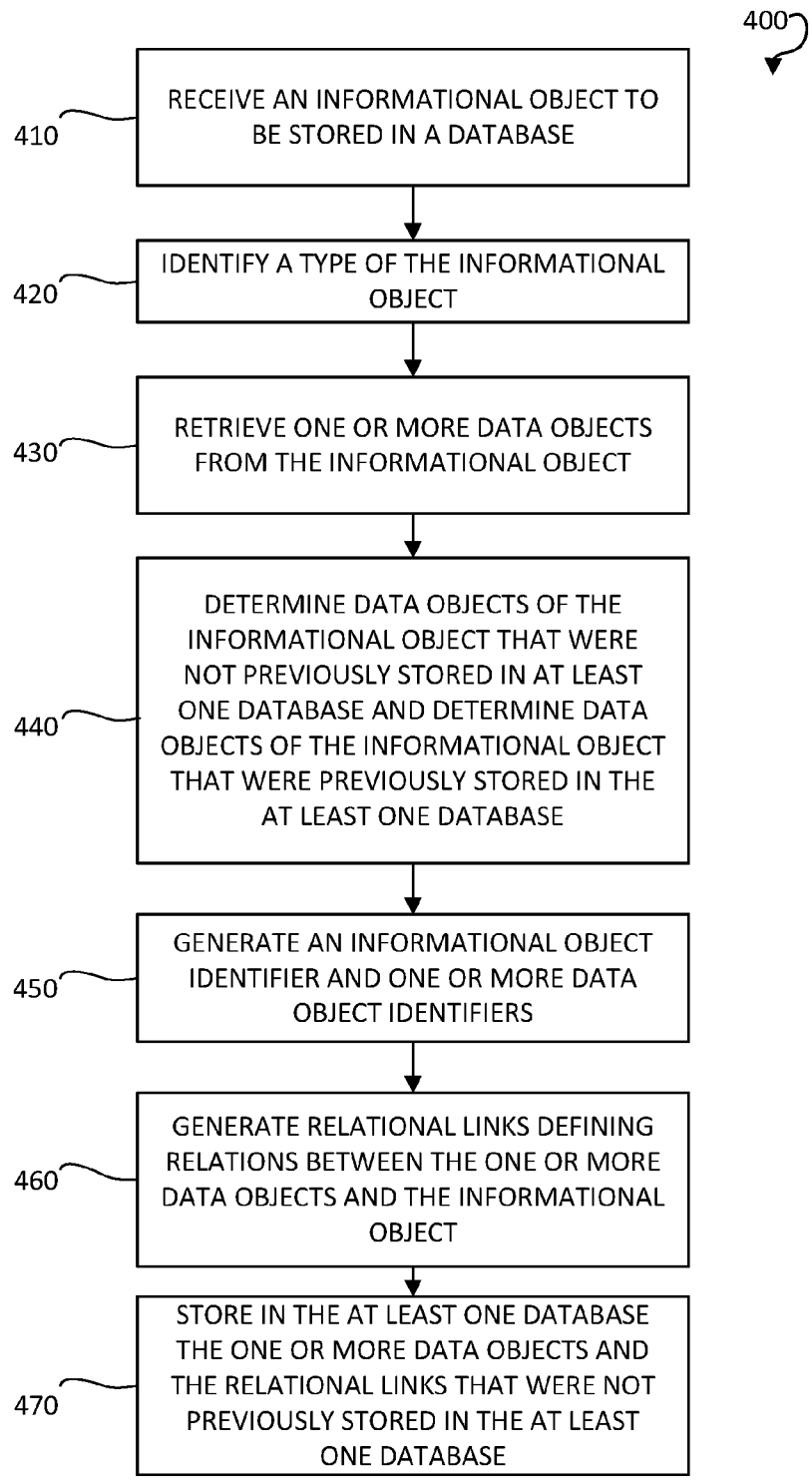
FIG. 4 is a process flow diagram showing an example method for data storing.

FIG. 4 is a process flow diagram showing a method 400 for data storing, according to an example embodiment. The method 400 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the data storing system 210. Each of these modules can comprise processing logic. It will be appreciated by one of ordinary skill that examples of the foregoing modules may be virtual, and instructions said to be executed by a module may, in fact, be retrieved and executed by a processor. The foregoing modules may also include memory cards, servers, and/or computer discs. Although various modules may be configured to perform one or more steps described herein, fewer or more modules may be provided and still fall within the scope of various embodiments.

As shown in FIG. 4, the method 400 may commence at operation 410 with the communication module 230 receiving an informational object to be stored in one or more databases 160, 170. As mentioned, the informational object may refer to any type of computer file or any suitable binary object.

At operation 420, the identifying module 270 identifies a type of the informational object received by the communication module 230. The type of informational object may include a Microsoft Word® document, Microsoft Outlook® e-mail document, Adobe® Portable Document Format (PDF) file, image, video, audio, and so forth.

At operation 430, the exploding module 240 retrieves one or more data objects from the informational object. The retrieving can be based upon the type the informational object as determined at operation 420. More specifically, depending on the informational object type, various techniques for separating the informational object into data objects can be applied.

At operation 440, the processing module 250 determines those data objects retrieved from the informational object that were not previously stored in BLOB database 160 or CLOB database 170. The processing module 250 also determines those data objects that were previously stored in BLOB database 160 or CLOB database 170.

At operation 450, the identifying module 270 generates an informational object identifier and data object identifier for every data object retrieved from the informational object.

At operation 460, the processing module 250 generates relational links defining relations between the data objects and the informational objects. The relational links may comprise the informational object identifier and data object identifiers. Furthermore, the relational links may further include memory address information defining storage locations of the data objects and the informational object.

At operation 470, the storing module 260 stores the data objects, which were not previously stored, in BLOB database 160 or CLOB database 170. Furthermore, the storing module 260 stores the relational links in the relational database 180. In an embodiment, the data objects can be compressed and/or encoded by the encoding module 280.

Furthermore, usage of stored data objects can be monitored and tracked (not shown). This information may facilitate ways for data access and caching. In addition, the method 400 may further include operation of caching the data objects.

Figure 5:
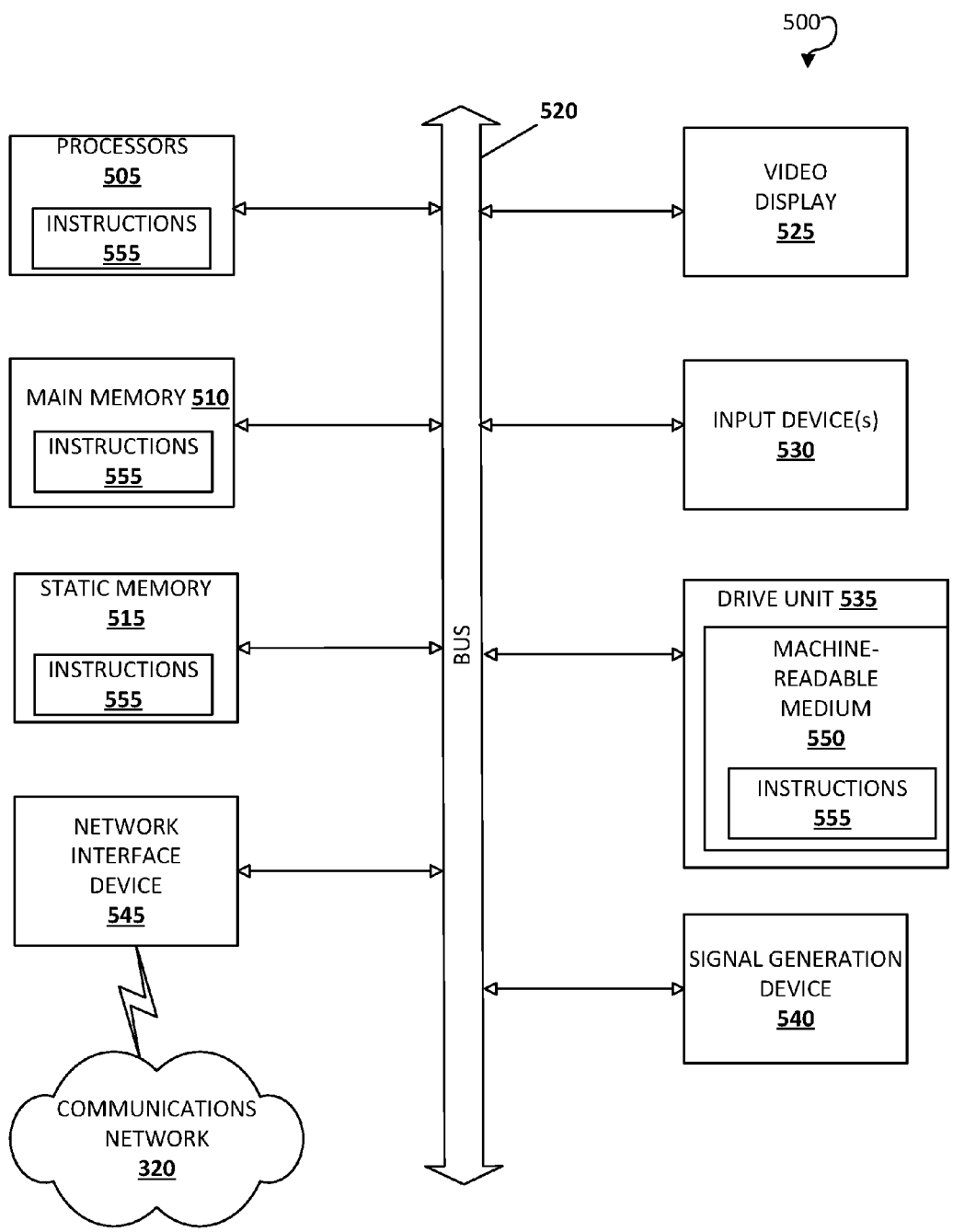
FIG. 5 is a diagrammatic representation of an example machine in the form of a computer system within which a set of instructions, for the machine to perform any one or more of the methodologies discussed herein, is executed.

FIG. 5 shows a diagrammatic representation of a computing device for a machine in the example electronic form of a computer system 500, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server, or a client machine in a server-client network environment, or as a peer machine in a peer-to-peer (or distributed) network environment. The machine can be a personal computer (PC), a tablet PC, a set-top box (STB), a PDA, a cellular telephone, a portable music player (e.g., a portable hard drive audio device, such as a Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor or multiple processors 505 (e.g., a central processing unit (CPU), a graphics processing unit (GPU), or both), and a main memory 510 and a static memory 515, which communicate with each other via a bus 520. The computer system 500 can further include a video display unit 525 (e.g., a LCD or a cathode ray tube (CRT)). The computer system 500 also includes at least one input device 530, such as an alphanumeric input device (e.g., a keyboard), a cursor control device (e.g., a mouse), a microphone, a digital camera, a video camera, and so forth. The computer system 500 also includes a disk drive unit 535, a signal generation device 540 (e.g., a speaker), and a network interface device 545.

The disk drive unit 535 includes a computer-readable medium 550, which stores one or more sets of instructions and data structures (e.g., instructions 555) embodying or utilized by any one or more of the methodologies or functions described herein. The instructions 555 can also reside, completely or at least partially, within the main memory 510 and/or within the processors 505 during execution thereof by the computer system 500. The main memory 510 and the processors 505 also constitute machine-readable media.

The instructions 555 can further be transmitted or received over the communications network 320 via the network interface device 545 utilizing any one of a number of well-known transfer protocols (e.g., Hyper Text Transfer Protocol (HTTP), CAN, Serial, and Modbus).

While the computer-readable medium 550 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Thus, computer-implemented methods and systems for effective redundant data storing which allow reducing storage requirements and speeding up various storage operations. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for storing data using a data storing system that comprises a processor and a memory for storing instruction that when executed by the processor cause the data storing system to perform the method, comprising:
   receiving a computer file;
   separating the received computer file into a plurality of data objects;
   analyzing a database and each of the plurality of data objects of the computer file to determine both:
      which data objects of the computer file were not previously stored in the database, and
      which data objects of the computer file are already stored in the database;
   generating relational links between the data objects already stored in the database and the data objects of the computer file that were previously stored in the database; and
   storing in the database both:
      the data objects that were not previously stored in the database, and
      the generated relational links instead of the data objects that are already stored in the database.

2. The method of claim 1, further comprising identifying a type of the computer file, wherein retrieving of the plurality of data objects from the computer file is based upon the type of the computer file.

3. The method of claim 2, further comprising storing the computer file as a binary object in the database if the type of computer file is not identified.

4. The method of claim 1, further comprising:
   generating relational links between the computer file and the data objects that were not previously stored in the database; and
   storing in the database the relational links generated for the data objects that were not previously stored in the database.

5. The method of claim 1, wherein the relational links define storage locations associated with the already stored data objects in the database and/or an order of the already stored data objects as presented in the computer file.

6. The method of claim 1, further comprising compressing or encoding the generated relational links.

7. The method of claim 1, wherein the plurality of data objects and the relational links are stored in different databases.

8. The method of claim 1, further comprising:
   tracking a frequency of usage of the plurality of data objects; and
   caching one or more stored data objects based on the frequency of usage.

9. The method of claim 1, further comprising caching one or more monitored data objects based on a frequency of access.

10. The method of claim 1, wherein the plurality of data objects are stored at least as a part of a binary large object (BLOB).

11. The method of claim 1, wherein the plurality of data objects are stored at least as a part of a character large object (CLOB).

12. The method of claim 1, further comprising:
   generating a computer file identifier uniquely identifying the computer file; and
   generating a plurality of data object identifiers uniquely identifying the plurality of data objects.

13. The method of claim 12, wherein the relational links are associated with the computer file identifier and the plurality of data object identifiers.

14. The method of claim 1, wherein the computer file comprises one or more of the following: a computer file, a binary object, and a program code.

15. The method of claim 1, wherein the data objects comprise one or more of the following: a text, an image, a video, an audio, a multimedia object, a program code, a numerical value, and a data structure.

16. A system for storing data, the system comprising:
a processor; and
a memory for storing executable instructions that are executed by the processor, the
executable instructions comprising:
  a communication module configured to receive a computer file;
  an exploding module configured to separate the received computer file into a plurality of data objects;
  a processing module configured to:
    analyze a database and each of the plurality of data objects to determine both:
      those data objects of the computer file that were not previously stored in the database, and
      those data objects of the computer file that are already stored in the database, and
    generate relational links between the data objects already stored in the database and the data objects of the computer file that were previously stored in the database; and
  a storing module configured to store in the database both:
    the data objects that were not previously stored in the database, and
    the generated relational links instead of the data objects that are already stored in the database.

17. The system of claim 16, further comprising an identifying module configured to identify a type of the computer file, wherein retrieving of one or more data objects from the computer file is based upon the type of the computer file.

18. The system of claim 16, wherein the processing module is further configured to determine data objects of the computer file that were previously stored in the database.

19. The system of claim 16, further comprising an encoding module configured to compress or encode the one or more data objects.

20. A non-transitory processor-readable medium having instructions stored thereon, which when executed by one or more processors, cause the one or more processors to:
receive a first computer file;
separate the first computer file into a plurality of data objects;
analyze a database and each of the data objects of the first computer file to determine both:
  data objects of the first computer file that were already previously stored in the database as data objects of a second computer file, and
  data objects of the first computer file that were not previously stored in the database as data objects of the second computer file;
generate relational links between the data objects already previously stored in the database as data objects of the second computer file and the data objects of the first computer file that were previously stored in the database as data objects of the second computer file; and
store in the database both:
  the data objects of the first computer file that were not previously stored in the database as data objects of the second computer file, and
  the generated relational links instead of the data objects that were already previously stored in the database as data objects of the second computer file.

21. A method for storing data using a data storing system that comprises a processor and a memory for storing instruction that when executed by the processor cause the data storing system to perform the method, comprising:
receiving a computer file;
storing the computer file as a single binary object if the computer file cannot be separated into a plurality of data objects;
separating the computer file into a plurality of data objects if the computer file is capable of being separated into the data objects;
generating relational links between the data objects and the computer file, the relational links defining an order of the data objects within the computer file that is utilized to reconstruct the computer file;
analyzing a database and each of the plurality of data objects of the computer file to determine both:
  which data objects of the computer file were not previously stored in the database, and
  which data objects of the computer file are already stored in the database; and
storing in the database data both:
the data objects that were not previously stored in the database, and
the generated relational links instead of the data objects that are already stored in the database.

* * * * *